United States Patent
Hu et al.

(10) Patent No.: US 12,448,019 B2
(45) Date of Patent: Oct. 21, 2025

(54) PULL HANDLE ASSEMBLY AND CART

(71) Applicants: DONGGUAN JINWANG CHILDREN PRODUCTSCO LTD., Guangdong (CN); BABY TREND, INC., Fontana, CA (US)

(72) Inventors: Jie Hu, Guangdong (CN); Chin-Kuan Lac, Fontana, CA (US); Michael Cavins, Fontana, CA (US)

(73) Assignees: DONGGUAN JINWANG CHILDREN PRODUCTSCO LTD., Guangdong (CN); BABY TREND, INC., Fontana, CA (US)

( * ) Notice: Subject to any disclaimer, the term of this patent is extended or adjusted under 35 U.S.C. 154(b) by 658 days.

(21) Appl. No.: 17/682,699

(22) Filed: Feb. 28, 2022

(65) Prior Publication Data

US 2022/0297736 A1 Sep. 22, 2022

Related U.S. Application Data

(63) Continuation of application No. PCT/CN2021/071006, filed on Jan. 11, 2021.

(30) Foreign Application Priority Data

Jan. 21, 2020 (CN) .......................... 202020141897.0

(51) Int. Cl.
*B62B 5/06* (2006.01)
*B62B 3/02* (2006.01)

(52) U.S. Cl.
CPC ................ *B62B 5/067* (2013.01); *B62B 3/02* (2013.01)

(58) Field of Classification Search
CPC ........... B62B 5/06; B62B 5/061; B62B 5/064; B62B 5/067
See application file for complete search history.

(56) References Cited

U.S. PATENT DOCUMENTS

| 2,469,242 | A | * | 5/1949 | Pohl | .......................... B62B 3/02 |
| | | | | | 280/651 |
| 4,887,836 | A | * | 12/1989 | Simjian | ................... B62B 3/007 |
| | | | | | 280/651 |

(Continued)

FOREIGN PATENT DOCUMENTS

| CN | 206107279 U | 4/2017 |
| CN | 109436080 A | 3/2019 |

(Continued)

OTHER PUBLICATIONS

(PCT) China National Intellectual Property Administration (ISA/CN), International Search Report (with English translation), International Application No. PCT/CN2021/071006, 8 pages, Apr. 2, 2021.

*Primary Examiner* — Katy M Ebner
(74) *Attorney, Agent, or Firm* — Thompson Hine LLP (57) ABSTRACT

A cart having a storable pull handle assembly and a pull handle assembly for a cart. In an embodiment, the cart includes having a frame, and the pull handle assembly includes a guide rail extending in a traveling direction of the frame and provided below the frame; a slide block slidably provided on the guide rail; and a pull handle movable between a stored position below the frame and an extended position where the pull handle is grasped by a user for pulling the cart. The pull handle includes a rod part and a grip part provided at a first end of the grip part, and a second end of the grip part is pivotally connected to the slide block.

18 Claims, 7 Drawing Sheets

(56) References Cited

U.S. PATENT DOCUMENTS

| | | | |
|---|---|---|---|
| 5,135,243 A | 8/1992 | Carpenter | |
| 5,653,458 A * | 8/1997 | Chaparian | B62B 3/02 |
| | | | 280/30 |
| 5,765,857 A * | 6/1998 | Hsiao | B62B 1/042 |
| | | | 280/DIG. 6 |
| 6,503,018 B2 * | 1/2003 | Hou | B62B 9/20 |
| | | | 403/104 |
| 6,536,796 B1 * | 3/2003 | Solomon | B62B 3/02 |
| | | | 280/655 |
| 6,550,801 B1 * | 4/2003 | Newhard | B62B 7/06 |
| | | | 403/97 |
| 6,877,764 B2 * | 4/2005 | Sagol | B62B 5/06 |
| | | | 280/655 |
| 6,886,852 B2 * | 5/2005 | Cheng | B62B 1/045 |
| | | | 280/DIG. 6 |
| 7,201,385 B2 * | 4/2007 | Renz | B62B 3/02 |
| | | | 280/655 |
| 7,617,569 B2 * | 11/2009 | Liao | E06C 1/32 |
| | | | 16/334 |
| 7,784,816 B2 * | 8/2010 | Jian | B62B 3/02 |
| | | | 280/38 |
| 8,820,775 B2 * | 9/2014 | Wang | A63B 55/60 |
| | | | 280/DIG. 6 |
| 8,827,305 B2 * | 9/2014 | Saito | B62B 5/067 |
| | | | 280/655.1 |
| 8,979,098 B2 * | 3/2015 | Wang | B62B 3/022 |
| | | | 280/651 |
| 9,108,656 B1 * | 8/2015 | Nolan | B62B 3/02 |
| 9,242,663 B1 * | 1/2016 | Nolan | F16C 11/10 |
| 9,358,445 B1 * | 6/2016 | Nolan | F16C 11/10 |
| 9,561,815 B2 * | 2/2017 | Choi | B62B 5/06 |
| 9,566,995 B2 * | 2/2017 | Strauss | B62B 7/06 |
| 9,650,060 B2 * | 5/2017 | Kopp | B62B 5/067 |
| 10,086,860 B2 * | 10/2018 | Jian | B62B 5/067 |
| 11,718,337 B2 * | 8/2023 | Ostergaard | B62B 3/007 |
| | | | 16/429 |
| 11,926,359 B1 * | 3/2024 | Wang | B62B 5/067 |
| 12,082,523 B2 * | 9/2024 | Driscoll | A01D 34/001 |
| 2002/0112561 A1 * | 8/2002 | Liao | B62K 21/16 |
| | | | 74/551.3 |
| 2004/0232660 A1 * | 11/2004 | Chen | B62B 3/02 |
| | | | 280/651 |
| 2005/0173895 A1 * | 8/2005 | Lin | B62B 3/12 |
| | | | 280/651 |
| 2008/0246238 A1 * | 10/2008 | Wu | B62B 3/12 |
| | | | 280/47.18 |
| 2018/0201290 A1 * | 7/2018 | Guerdrum | B62B 3/04 |
| 2020/0031376 A1 * | 1/2020 | Horowitz | B62B 3/025 |
| 2021/0061332 A1 * | 3/2021 | Sturgeon | B62B 9/142 |
| 2024/0253678 A1 * | 8/2024 | Beckwith | B62B 5/067 |

FOREIGN PATENT DOCUMENTS

| | | |
|---|---|---|
| CN | 211592635 U | 9/2020 |
| WO | 2006/060303 A2 | 6/2006 |

* cited by examiner

PULL HANDLE ASSEMBLY AND CART

TECHNICAL FIELD

The present disclosure relates to the field of carts, and more particularly to a pull handle assembly for a cart and a cart having the pull handle assembly.

BACKGROUND

Generally, carts are mostly provided with frames and handle assembles. In some carts, the handle assembly is located above the frame, occupies a large space and is inconvenient for extended operations.

SUMMARY

The present disclosure seeks to solve at least one of the problems existing in the related art. To this end, the present disclosure proposes a pull handle assembly for a cart to facilitate user operations and reduce space occupied by the cart.

The present disclosure is also intended to propose a cart having the above-described pull handle assembly.

In the pull handle assembly for the cart according to embodiments of the present disclosure, the cart includes a frame, and the pull handle assembly includes a guide rail, a slide block, and a pull handle. The guide rail is fixed to the frame, extends in a lengthwise or traveling direction of the frame, and in embodiments is provided below the frame. The slide block is slidably provided on the guide rail. The pull handle is movable between an accommodating or stored position where, in embodiments, it is stored below the frame and an extended position during extended. The pull handle includes a rod part and a grip part provided at a front end of the rod part, and a rear end of the rod part is pivotally connected to the slide block.

In the pull handle assembly for the cart according to exemplary embodiments of the present disclosure, by setting the pull handle to be movable between the stored position below the frame and the pull-out or extended position, when the pull handle is in the stored position, the effective length of the cart is reduced to the length of the cart frame, thereby reducing the overall length of the space occupied by the cart, facilitate storage of the cart extended, and reduce hindrance of the pull handle. For example, when the cart is adapted to carry an infant and the pull handle is in the stored position, it is convenient for seating of an infant in the cart and interaction between the user and the infant. For another example, when the cart is used to carry cargo and the pull handle is in the stored position, the space occupied by the cart is small to facilitate storage, and the pull handle will not hinder the user's handling, to make handling of the cargo more convenient and faster. When the pull handle is in the extended position, the pull handle can be convenient for the user to pull the cart, and facilitate controlling the direction of the cart, to make traveling of the cart safer.

In some embodiments, the pull handle assembly further includes a pivot connection provided between the slide block and the rod part to position the rod part relative to the slide block at a plurality of different pivot angles relative to the frame.

Specifically, the pivot connection includes a first pivot part provided on the slide block and internally defining a first pivot groove, a bottom wall of the first pivot groove being provided with first mating teeth; a second pivot part provided on the second end of the rod part and relatively rotatably connected to the first pivot part; a locking gear having an end provided with second mating teeth, the first mating teeth and the second mating teeth being engageable with each other; and a first elastic member configured to exert a force on the locking gear that urges the locking gear towards the first mating teeth.

Further, the first mating teeth and the second mating teeth protrude towards each other, and the first mating teeth and the second mating teeth separately form a ring gear structure.

In some optional embodiments, the second pivot part fits over an outside of the first pivot part, the second pivot part internally defines a second pivot groove, and an end of the locking gear away from the second mating teeth is fixedly connected to the second pivot groove.

Specifically, the second pivot groove is internally provided with a center mounting column, the locking gear defining a fitting hole fitted over the center mounting column; and a plurality of positioning ribs radially arranged around a circumference of the center mounting column, the locking gear being provided with a plurality of positioning side plates extending towards the positioning ribs, two adjacent positioning side plates defining a positioning groove therebetween, the plurality of positioning ribs being fitted in the plurality of positioning grooves in one-to-one correspondence.

Further, at least one positioning side plate defines a stepped groove, a circumferential wall of the second pivot groove is at least provided with one positioning block, and the stepped groove is fitted and positioned with the positioning block.

In some optional embodiments, the second pivot part is mounted to the rear end of the rod part through a sleeve, and the sleeve is integrally formed with the second pivot part.

In some embodiments, two rod parts are provided and attached to the grip part and spaced apart from each other; two pivot connections are provided and configured to respectively connect the two rod parts to the slide block.

In some embodiments, the frame further includes a cross bar, the cross bar and the guide rail are perpendicular to each other, the cross bar is provided with a handle retainer, and when the pull handle is in the stored position, the grip part is supported on the handle retainer.

In an exemplary embodiment, the handle retainer takes the form of a hook structure, and in a particular embodiment the handle retainer takes the form of two hook structures that are spaced from each other on the cross bar.

In other embodiments, the pull handle assembly includes a locking structure provided in the grip part, when the pull handle is in the stored position, and the locking structure engages the handle retainer to limit movement of the pull handle.

In an embodiment, the grip part defines an interior chamber, and the locking structure includes a body part provided in the interior chamber that is movable in the interior chamber. A button part is connected to the body part and protrudes from the interior chamber and a hook part is connected to the body part. The grip part defines a through hole so that when the body part moves in the interior chamber, the hook part extends out of or retracts into the interior chamber via the through hole. A second elastic member is provided in the interior chamber and is configured to urge the body part to extend from the interior chamber through the through hole to engage hook part.

The locking structure also includes an abutting part connected to the body part, and the ends of the second elastic member extend between and urge against the abutting part and an inner wall of the interior chamber, respectively.

The cart according to embodiments of the present disclosure includes a pull handle assembly for a cart according to above-described embodiments of the present disclosure.

In the cart according to embodiments of the present disclosure, by setting the pull handle to be movable between the stored position below the frame and the extended position, when the pull handle is in the stored position, the overall length of the cart is reduced, thereby reducing the longitudinal space occupied by the cart and eliminates any hindrance from the pull handle. For example, when the cart is adapted to carry an infant and the pull handle is in the stored position, it is convenient for seating of the infant and interaction between the user and the infant. In another example, when the cart is used to carry cargo and the pull handle is in the stored position, the space occupied by the cart is smaller to facilitate storage, and the pull handle will not hinder the user's handling, to make handling of the cargo more convenient and faster. When the pull handle is in the extended position, the pull handle can be convenient for the user to pull the cart, and easy to control the direction of the cart, to make traveling of the cart safer.

Additional aspects and advantages of the present disclosure will be given in part in the following descriptions, become apparent in part from the following descriptions, or be learned from the practice of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, illustrative, and only used to generally understand the present disclosure. The embodiments shall not be construed to limit the present application.

In the specification, it is to be understood that terms such as "upper," "lower," "top," "bottom," "inner," "outer," "central," "longitudinal," "lateral," "vertical," "horizontal," "axial," and "circumferential" should be construed to refer to the orientation as then described or as shown in the drawings under discussion. These relative terms are for convenience of description and do not require that the present disclosure be constructed or operated in a particular orientation, and thus cannot be construed to limit the present disclosure. In addition, the feature defined with "first" and "second" may comprise one or more of this feature. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements. These having ordinary skills in the art should understand the specific meanings in the present disclosure according to specific situations.

A pull handle assembly 100 for a cart according to embodiments of the present disclosure will be described below with reference to FIGS. 1 to 6.

Figure 1:
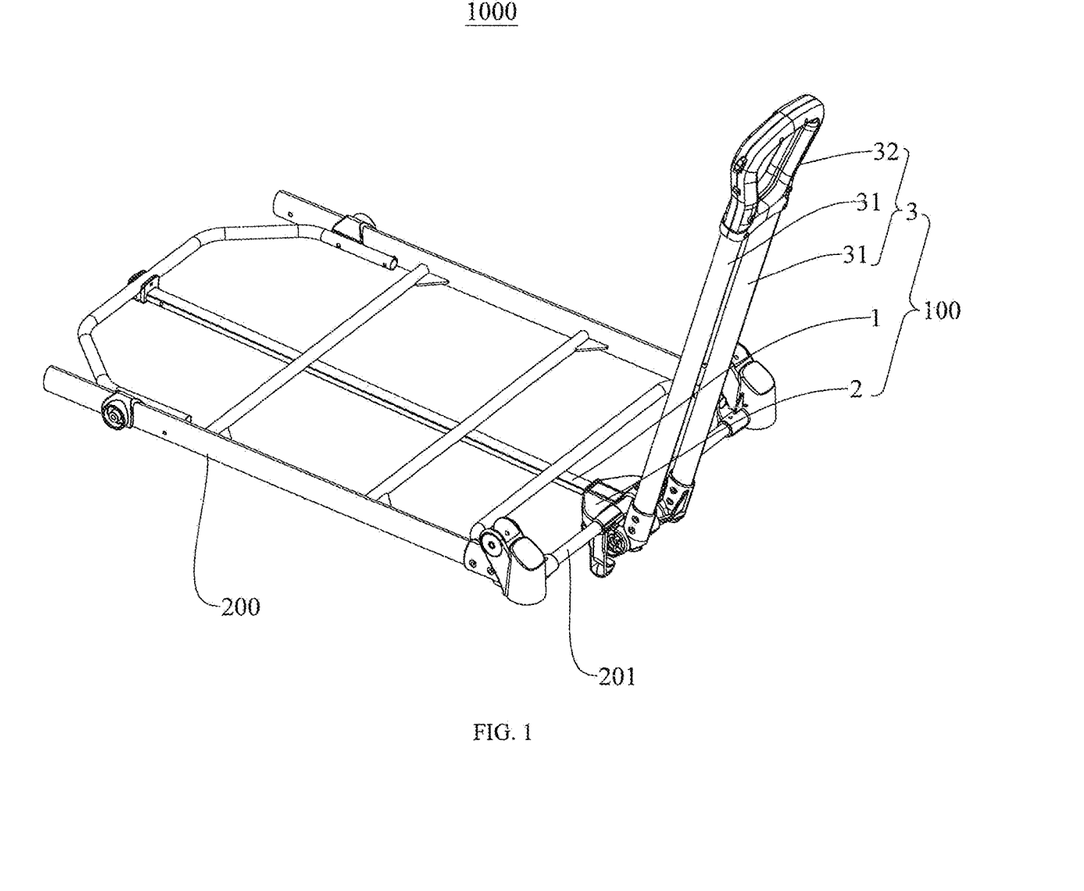
FIG. 1 is a schematic view of partial structure of a cart according to an embodiment of the present disclosure, in which a frame and a pull handle assembly are shown.

In the pull handle assembly 100 according to embodiments of the present disclosure, as illustrated in FIG. 1, the cart 1000 includes a frame 200, and the pull handle assembly 100 includes a slide rail 1, a pull handle 3 and a slide block 2. The slide rail 1 extends in a traveling direction of the frame 200 and in a particular embodiment is provided below the frame 200. The slide block 2 is slidably mounted on the guide rail 1. The pull handle 3 is movable between a stored position where it is stored below the frame 200 and an extended position. The pull handle 3 includes a rod part 31 and grip part 32, the grip part 32 is provided at a first or front end of the rod part 31, and a second or rear end of the rod part 31 is pivotally connected to the slide block 2.

The provision of the guide rail 1 has a guiding effect on the movement of the slide block 2, which improves the stability of the movement of the slide block 2. In in this way, the slide block 2 can stably drive the rod part 31 to slide, the pull handle 3 can be stored below the frame 200, and the pull handle 3 can also be stably slid out from the frame. That is, the stability of movement of the pull handle 3 between the stored position where it is stored below the frame 200 and the extended position can be improved. Herein, the rearward end of the rod part 31 is pivotally connected to the slide block 2. In this way, when the cart 1000 is pulled, the rearward end of the rod part 31 can be rotated or pivoted relative to the slide block 2. For example, the rearward end of the rod part 31 can be pivoted to be parallel to the guide rail 1. In this way, the movement of the rod part 31 between the stored position and the extended position is facilitated.

In some prior art pull handle assembles, the cart pull handle is fixed and has only an extended position. Thus, the user has a limited range of options, which is inconvenient. For example, when such a prior art cart is unloaded, the position of the pull handle can easily hinder the activity of the user in loading and unloading the cart. For example, after using such a prior art cart, the pull handle is fixed in a pulled-out or extended position and occupies a large space during storage. In embodiments of the pull handle assembly 100 of the present invention, when the pull handle 3 is in the stored position, the pull handle 3 is located below the frame 200. Thus, the cart 1000 can become shorter, reduce the space occupied by the cart 1000, facilitate the user's operations, and reduce hindrance of the pull handle 3. For example, when the cart 1000 is adapted to carry an infant and the pull handle 3 is in the stored position, it is convenient for seating of the infant and interaction between the user and the infant. For another example, when the cart 1000 is used to carry cargo and the pull handle 3 is in the stored position, the space occupied by the cart 1000 is reduced to facilitate storage, and the pull handle 3 will not hinder the user's handling, to make handling of the cargo more convenient and faster. When in the extended position, the pull handle 3 can be convenient for the user to pull the cart 1000, and facilitate controlling the direction of the cart 1000, to make traveling of the cart 1000 safer. That is to say, the pull handle assembly 100 has high convenience, and can be switched between the stored position and the extended position, and the user can freely switch the state of the pull handle 3 according to practical requirements during actual extended.

Additionally, the grip part 32 provides an adjustable height hand grip for the user, and can further improve the convenience for the user to switch the stored and extended states of the pull handle 3 and the cart 1000.

In the pull handle assembly 100 for the cart 1000 according to embodiments of the present disclosure, by setting the pull handle 3 to be movable between the stored position where it is stored below the frame 200 and the extended position, when the pull handle 3 is in the stored position, the cart 1000 can become shorter, reduce the space occupied by the cart 1000, facilitate the user's operations, and reduce hindrance of the pull handle 3. For example, when the cart 1000 is adapted to carry an infant and the pull handle 3 is in the stored position, it is convenient for seating of the infant and interaction between the user and the infant. For another example, when the cart 1000 is used to carry cargo and the pull handle 3 is in the stored position, the space occupied by the cart 1000 is reduced to facilitate storage of the cart, and the pull handle 3 will not hinder the user's handling, to improve efficiency of handling of the cargo. When the pull handle 3 is in the extended position, the pull handle 3 can be convenient for the user to pull the cart 1000, and facilitate controlling the direction of the cart 1000, to make traveling of the cart 1000 safer.

Figure 2:
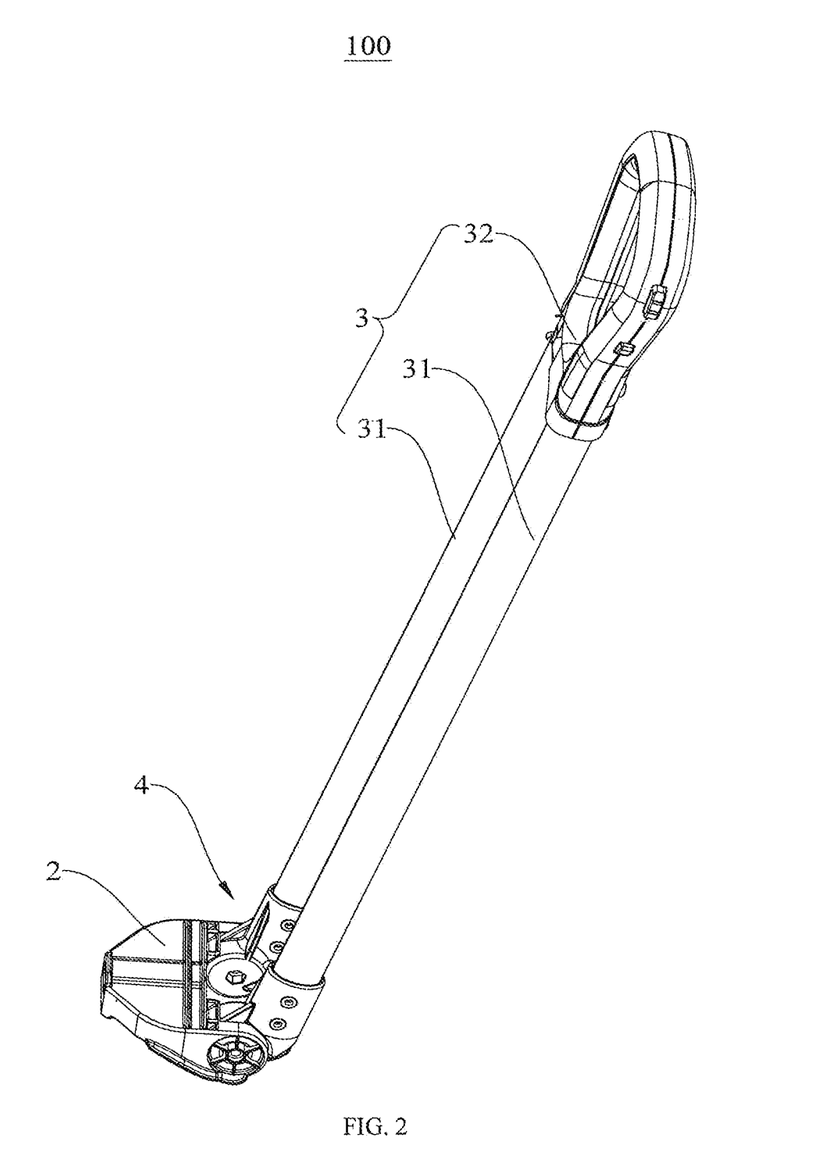
FIG. 2 is a schematic view of partial structure of a pull handle assembly according to an embodiment of the present disclosure, in which a slide block, a grip and a pivot connection are shown.

In some embodiments, as illustrated in FIG. 2, the pull handle assembly 100 further includes a pivot connection 4, and the pivot connection 4 is provided between the slide block 2 and the rod part 31 to position the rod part 31 relative to the slide block 2 at a plurality of different pivot angles. It could be understood that the provision of the pivot connection 4 can have limiting and fixing effect on the rod part 31, and the rod part 31 can have a plurality of different position angles relative to the slide block 2. That is to say, the rod part 31 can be rotated or pivoted through a plurality of different pivot angles relative to the slide block 2, and stably positioned at the plurality of different pivot angles by the pivot connection 4. Thus, the applicable range of the pull handle assembly 100 can be further expanded. For example, the pull handle assembly 100 for the cart can be pivoted to suit people of differing heights. For example, the rod part 31 has a plurality of different pivot angles relative to the slide block 2, so the user can adjust and position the rod part 31 to a certain pivot angle relative to the slide block 2 according to their own height, usage habit, etc. In this way safety and convenience are improved.

Figure 3:
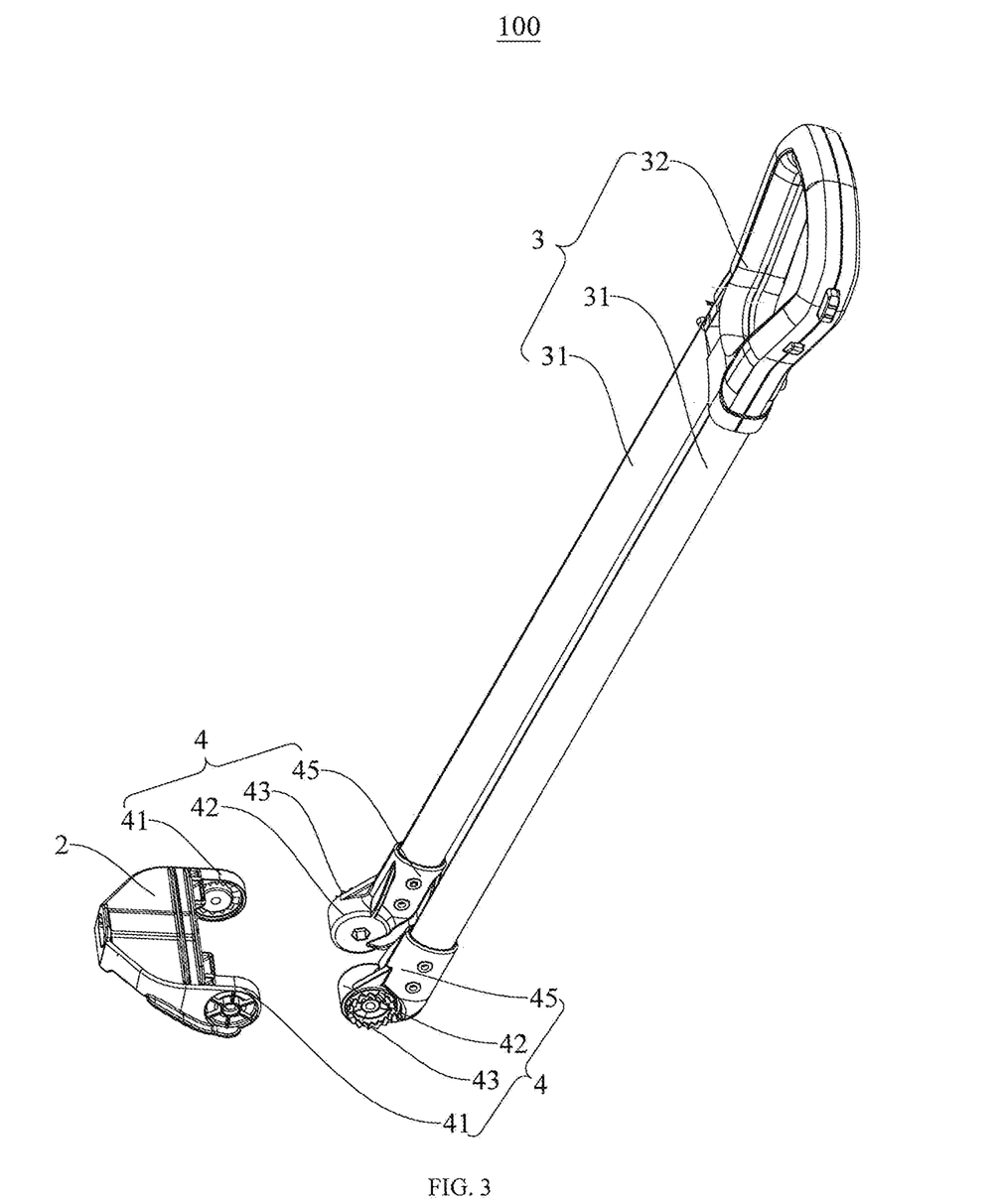
FIG. 3 is an exploded view of the structure illustrated in FIG. 2.
Figure 4:
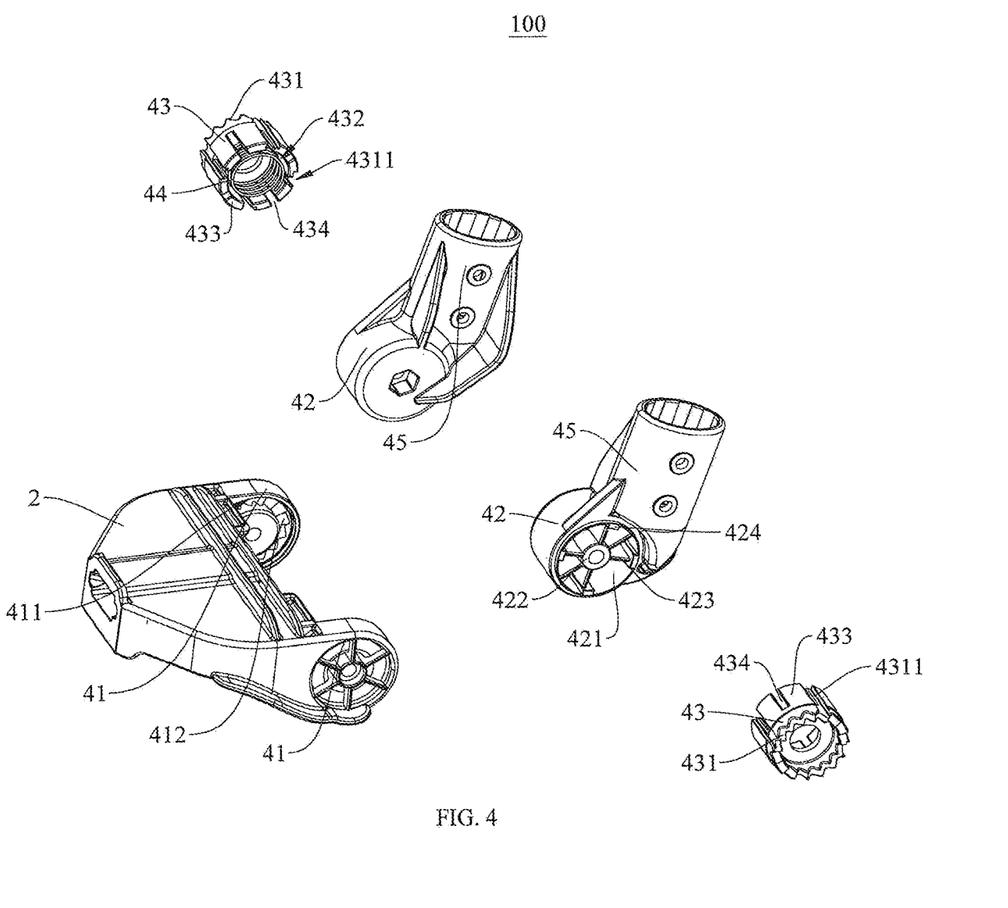
FIG. 4 is an exploded view of partial structure of the pull handle assembly according to an embodiment of the present disclosure, in which a slide block and a pivot connection are shown.

Specifically, as illustrated in FIGS. 3 and 4, the pivot connection 4 includes a first pivot part 41, a second pivot part 42, a locking gear 43 and a first elastic member 44. The first pivot part 41 is provided on the slide block 2 and internally defines a first pivot groove 411, and a bottom wall of the first pivot groove 411 is provided with first mating teeth 412. The second pivot part 42 is provided at a rearward end of the rod part 31, and the second pivot part 42 and the first pivot part 41 are relatively rotatably connected. The locking gear 43 has an end provided with second mating teeth 431, and the first mating teeth 412 and the second mating teeth 431 are engageable with each other. A first elastic member 44 is used to resiliently urge the locking gear 43 towards the first mating teeth 412. When the user rotates the pull handle 3, the rearward end of the rod part 31 causes the second pivot part 42 and the locking gear 43 to rotate synchronously, and the second mating teeth 431 at the other end of the locking gear 43 will engage and rotate relative to the first mating teeth 412, to achieve relative rotation between the second pivot part 42 and the first pivot part 41.

By employing the engagement form of the locking gear 43 and the second mating teeth 431, the stability is increased, and the locking structure is simplified. Additionally, the first elastic member 44 can exert resilient force to urge the locking gear 43 towards the first mating teeth 412, and the locking gear 43 is normally fitted on the first mating teeth 412, to improve the stability of the engagement of the first mating teeth 412 and the second mating teeth 431 relative to each other and improve the reliability of the adjustment and positioning of the rod part 31.

Optionally, as illustrated in FIGS. 3 and 4, taking an axial direction of the locking gear 43 as a first reference direction, the second pivot part 42, the locking gear 43 and the first pivot part 41 are fitted sequentially in the first reference direction. Thus, the layout of the pivot connection 4 is made more compact, the force transmission can be more stable, and the positioning of the pull handle 3 more secure.

Further, as illustrated in FIG. 4, the first mating teeth 412 and the second mating teeth 431 protrude towards each other, and the first mating teeth 412 and the second mating teeth 431 separately form a ring gear structure. The ring gear structure facilitates the adjustment of the angle of the first mating teeth 412 and the second mating teeth 431 and can improve the stability of the positioning between the first mating teeth 412 and the second mating teeth 431.

Optionally, as illustrated in FIG. 4, the first mating teeth 412 include a plurality of first teeth, and the plurality of first teeth are evenly spaced apart along the first pivot groove 411 to form the ring gear structure.

Optionally, as illustrated in FIG. 4, taking a circumferential direction of the locking gear 43 as a second reference direction, the second mating teeth 431 include a plurality of second teeth, and the plurality of second teeth are evenly spaced apart along the second reference direction to form the ring gear structure.

In some optional embodiments, as illustrated in FIGS. 3 and 4, the second pivot part 42 is able to fit over an outside of the first pivot part 41, the second pivot part 42 internally defines a second pivot groove 421, and an end of the locking gear 43 away from the second mating teeth 431 is fixedly connected to the second pivot groove 421. Thus, the reliability of the fitting between the first pivot part 41 and the second pivot part 42 is increased to further improve stability of the relative rotation between the first pivot part 41 and the second pivot part 42. The end of the locking gear 43 away from the second mating teeth 431 is fixedly connected to the second pivot groove 421 so that the end of the locking gear 43 away from the second mating teeth 431 and the second pivot groove 421 do not rotate relative to each other.

Specifically, as illustrated in FIG. 4, the second pivot groove 421 is internally provided with a center mounting column 422 and a plurality of positioning ribs 423. The locking gear 43 defines a fitting hole 432, and the fitting hole 432 is fitted over the center mounting column 422. It could be understood that the provision of the center mounting column 422 can not only improve the structural strength of the second pivot part 42 to promote the service life of the second pivot part 42, but also the center mounting column 422 can improve the stability of the fitting of the second pivot part 42 and the locking gear.

The plurality of positioning ribs 423 are radially arranged around a circumference of the center mounting column 422, the locking gear 43 is provided with a plurality of positioning side plates 433 extending towards the positioning ribs 423, two adjacent positioning side plates 433 define a positioning groove 432 therebetween, and the plurality of positioning ribs 423 are fitted in the plurality of positioning grooves 432 in one-to-one correspondence. Thus, the positioning side plates 433 and the positioning ribs 423 can limit mutually to improve synchronization of the movement of the second pivot part 42 and the locking gear.

Further, as illustrated in FIG. 4, at least one positioning side plate 433 defines a stepped groove 4311, a circumferential wall of the second pivot groove 421 is at least provided with one positioning block 424, and the stepped groove 4311 is fitted and positioned with the positioning block 424. Thus, the stability of the positioning between the second pivot part 42 and the locking gear is promoted, to further promote synchronization of the movement of the second pivot part 42 and the locking gear.

Optionally, as illustrated in FIG. 4, the second mating teeth 431 are located at an end of the locking gear 43 towards the first pivot part 41, and the positioning side plates 433 are located at an end of the locking gear 43 towards the second pivot part 42. Thus, reliable fitting with the first mating teeth 412 and the second pivot groove 421 can be realized separately.

In some optional embodiments, as illustrated in FIG. 4, the second pivoting part 42 is mounted to the second end of the rod part 31 through a sleeve 45, and the sleeve 45 is integrally formed with the second pivot part 42. It could be understood that the provision of the sleeve 45 can promote stability of the mounting of the second pivot part 42 and the second end of the rod part 31, and promote the stability of the movement of the pull handle 3 in the stored position and the extended position. Additionally, the sleeve 45 is set to be integrally formed with the second pivot part 42. Thus, the structural strength of the second pivot part 42 can be improved to further improve the reliability of the pull handle assembly 100.

In some embodiments, as illustrated in FIG. 3, two rod parts 31 are provided, the two rod parts 31 are arranged on the grip part 32 and spaced apart from each other; two pivot connections 4 are provided and used to respectively connect the two rod parts 31 to the slide block 2. Thus, the structural strength of the pull handle assembly 100 can be improved to improve the stability of the switching of the movement states of the pull handle 3 and improve the service life of the pull handle assembly 100.

Optionally, the two rod parts 31 are arranged symmetrically, and the two pivot connections 4 are arranged symmetrically. Thus, the stability of pivoting of the two rod parts 31 relative to the slide block 2 can be promoted, and the stability of positioning of the pivot connections 4 on the rod part 31 is improved.

Figure 5:
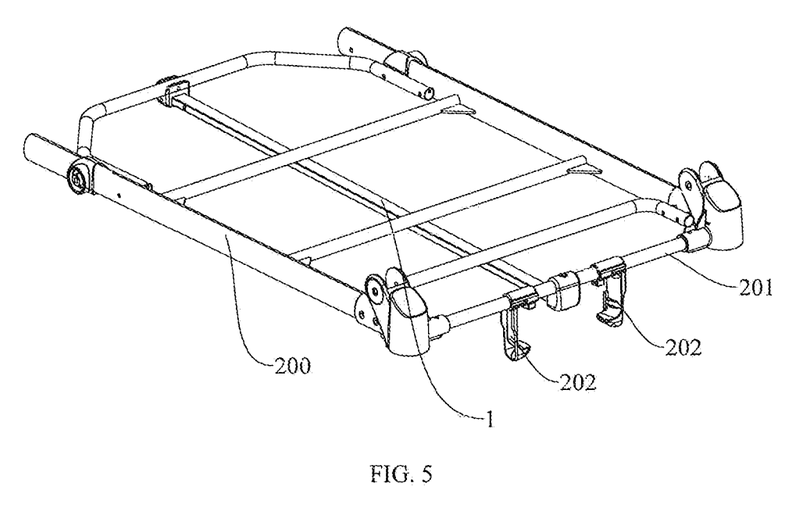
FIG. 5 is a schematic view showing a guide rail and a frame according to an embodiment of the present disclosure.

In some embodiments, as illustrated in FIG. 5, the frame 200 also includes a cross bar 201, the cross bar 201 and the guide rail 1 are perpendicular to each other, and the cross bar 201 is provided with a handle retainer 202. When the pull handle 3 is in the stored position, the grip part 32 is supported on the handle retainer 202. It could be understood that the provision of the cross bar 201 can promote the structural strength of the frame 200. Additionally, the cross bar 201 also provides a mounting place for the handle retainer 202, to promote the stability of the mounting of the handle retainer 202. Thus, when the pull handle 3 is located in the stored position and the grip part 32 is supported on the handle retainer 202, the handle retainer 202 can have good supporting effect on the pull handle 3, to improve the stability of stored of the grip part 32.

Specifically, as illustrated in FIG. 5, the handle retainer 202 forms a hook structure, two handle retainers 202 are provided and spaced apart in a length direction of the cross bar 201. Thus, the stability of the support of the handle retainer 202 can be promoted to further promote the supporting effect of the handle retainer 202 on the grip part 32.

Figure 6:
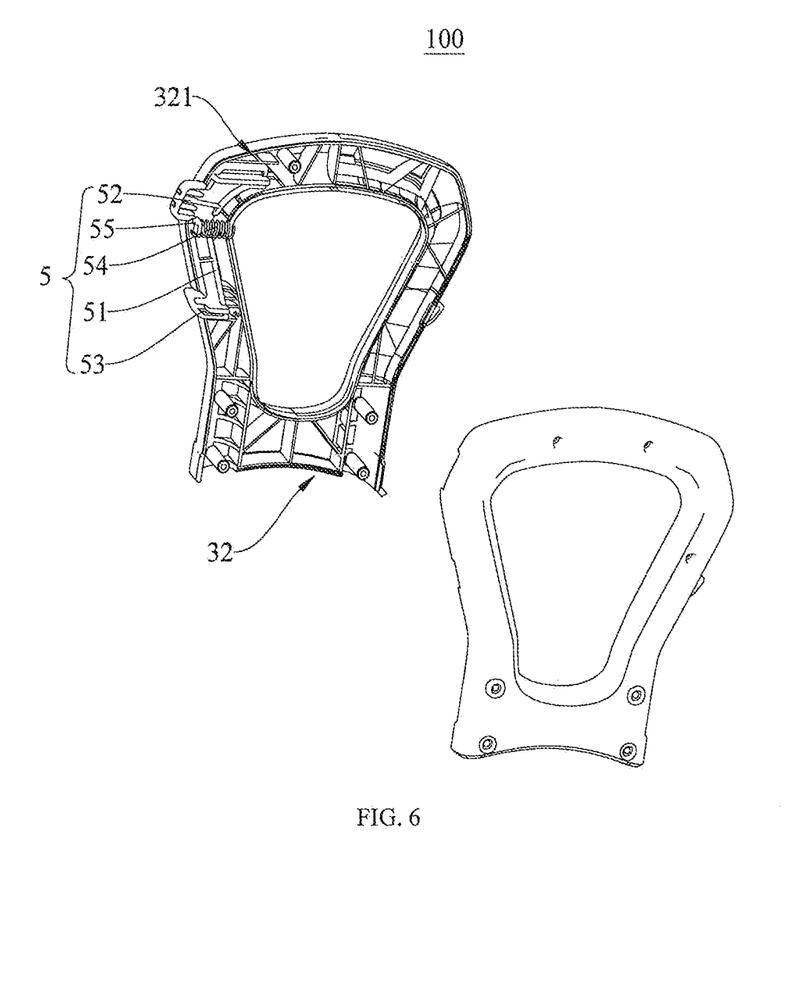
FIG. 6 is an exploded view of an embodiment of a grip part according to an embodiment of the present disclosure, in which the interior chamber and locking structure are shown.

In some optional embodiments, as illustrated in FIGS. 3 and 6, the pull handle assembly 100 further includes a locking structure 5, the locking structure 5 is provided in the grip part 32, and when the pull handle 3 is located in the stored position, the locking structure 5 is fitted with the handle retainer 202 to limit freedom of movement of the pull handle 3. Thus, when in the stored position, the pull handle 3 is in a locked state, and the safety of the pull handle 3 can be promoted. For example, when the cart 1000 is placed on an inclined place, the fitting of the locking structure 5 and the handle retainer 202 limit the freedom of the movement of the pull handle 3, and the pull handle 3 will not extend out automatically, to make the accommodated state more stable, and the safety higher.

Specifically, as illustrated in FIG. 6, the grip part 32 defines an interior chamber 321, and the locking structure 5 includes a body part 51, a button part 52, a hook part 53 and a second elastic member 54. The body part 51 is provided in the interior chamber 321, and the body part 51 is movable in the interior chamber 321. The button part 52 is connected to the body part 51, and the button part 52 protrudes from the interior chamber 321. The hook part 53 is connected to the body part 51, the grip part 32 defines a through hole, and when the body part 51 moves in the interior chamber 321, the hook part 53 can extend out of or retract into the interior chamber 321 via the through hole. The second elastic member 54 is provided in the interior chamber 321 and used to exert a force on the body part 51 to urge the hook part 53 to extend out of the interior chamber 321. It could be understood that during actual use, the user can press the button part 52, the button part 52 drives the body part 51 to move in a direction away from the button part 52, and in this case, the body part 51 compresses the second elastic member 54, the hook part 53 retracts into the interior chamber 321, or the amount of extension of the hook part 53 is reduced, and the hook part 53 can thus pass through the handle retainer 202. When the user releases the button part 52, the second elastic member 54 restores deformation to urge the body part 51 to extend the hook part 53 out of the interior chamber 321, and the amount of extension of the hook part 53 increases, and the hook part 53 can be snap-fitted to the handle retainer 202 to limit the freedom of the movement of the pull handle 3. Herein, the locking structure 5 is simple and has a compact and ingenious design, which facilitates the control of the state of the hook part 53 and is convenient to a user.

Further, as illustrated in FIG. 6, the locking structure 5 further includes an abutting part 55, the abutting part 55 is connected to the body part 51, and two ends of the second elastic member 54 abut against the abutting part 55 and an inner wall of the interior chamber 321 respectively. It could be understood that the abutting part 55 can have limiting effect on the second elastic member 54 to promote stability of the operation of the second elastic member 54. Additionally, the provision of the abutting part 55 can also improve the structural strength of the body part 51 to promote the stability of the locking of the locking structure 5.

A pull handle assembly 100 for a cart according to a specific embodiment of the present disclosure will be described below with reference to FIGS. 1 to 6.

In the pull handle assembly 100 according to embodiments of the present disclosure, the cart 1000 includes a frame 200, and the frame 200 includes a cross bar 201. The pull handle assembly 100 includes a guide rail 1, a pull handle 3, a slide block 2, a pivot connection 4, and a locking structure 5.

The guide rail 1 extends in a traveling direction of the frame 200 and is provided below the frame 200.

The slide block 2 is slidably provided on the guide rail 1.

The pull handle 3 is movable between a stored position where it is accommodated below the frame 200 and an extended position. The pull handle 3 includes a rod part 31 and a grip part 32, the grip part 32 is provided at a first end of the rod part 31, and a second end of the rod part 31 is pivotally connected to the slide block 2. When the pull handle 3 is in the stored position, the pull handle 3 is located below the frame 200. Two rod parts 31 are provided, and the two rod parts 31 are arranged on the grip part 32 and spaced apart from each other.

The pivot connection 4 is provided between the slide block 2 and the rod part 31 to position the rod part 31 relative to the slide block 2 at a plurality of different pivot angles. In one embodiment, two pivot connections 4 are provided and used to respectively connect the two rod parts 31 to the slide block 2. The pivot connections 4 may each includes a first pivot part 41, a second pivot part 42, a locking gear 43 and a first elastic member 44. The first pivot part 41 is provided on the slide block 2 and internally defines a first pivot groove 411, and a bottom wall of the first pivot groove 411 is provided with first mating teeth 412. The second pivot part 42 is provided at a second end of the rod part 31, and the second pivot part 42 and the first pivot part 41 are relatively rotatably connected. The locking gear 43 has an end provided with second mating teeth 431, and the first mating teeth 412 and the second mating teeth 431 are engageable with each other. The first elastic member 44 is used to exert a force on the locking gear 43 to urge the locking gear towards the first mating teeth 412. The first mating teeth 412 and the second mating teeth 431 protrude towards each other, and the first mating teeth 412 and the second mating teeth 431 separately form a ring gear structure. The second pivot part 42 is able to fit over an outside of the first pivot part 41, the second pivot part 42 internally defines a second pivot groove 421, and an end of the locking gear 43 away from the second mating teeth 431 is fixedly connected to the second pivot groove 421. The second pivot groove 42 is internally provided with a center mounting column 422 and a plurality of positioning ribs 423. The locking gear 43 defines a fitting hole 432, and the fitting hole 432 is fitted over the center mounting column 422. The plurality of positioning ribs 423 are radially arranged around a circumference of the center mounting column 422, the locking gear 43 is provided with a plurality of positioning side plates 433 extending towards the positioning ribs 423, two adjacent positioning side plates 433 define a positioning groove 432 therebetween, and the plurality of positioning ribs 423 are fitted in the plurality of positioning grooves 432 in one-to-one correspondence. The positioning side plate 433 defines a stepped groove 4331, a circumferential wall of the second pivot groove 421 is provided with a positioning block 424, and the stepped groove 4331 is fitted and positioned with the positioning block 424. The second pivot part 42 is mounted to the second end of the rod part 31 through a sleeve 45, and the sleeve 45 is integrally formed with the second pivot part 42.

The cross bar 201 and the guide rail 1 are perpendicular to each other, and the cross bar 201 is provided with a handle retainer 202. The handle retainer 202 forms a hook structure, two handle retainers 202 are provided and spaced apart in a length direction of the cross bar 201. When the pull handle 3 is located in the stored position, the grip part 32 is supported on the handle retainer 202.

The locking structure 5 is provided in the grip part 32, and when the pull handle 3 is located in the stored position, the locking structure 5 is fitted with the handle retainer 202 to limit freedom of movement of the pull handle 3. The grip part 32 internally defines an interior chamber 321, and the locking structure 5 includes a body part 51, a button part 52, a hook part 53, a second elastic member 54 and an abutting part 55. The body part 51 is provided in the interior chamber 321, and the body part 51 is movable in the interior chamber 321. The button part 52 is connected to the body part 51, and the button part 52 protrudes from the interior chamber 321. The hook part 53 is connected to the body part 51, the grip part 32 defines a through hole, and when the body part 51 moves in the interior chamber 321, the hook part 53 can extend out of or retract into the interior chamber 321 via the through hole. The second elastic member 54 is provided in the interior chamber 321 and used to exert a force on the body part 51 to urge the hook part 53 to extend out of the interior chamber 321. The abutting part 55 is connected to the body part 51, and two ends of the second elastic member 54 abut against the abutting part 55 and an inner wall of the interior chamber 321 respectively.

A cart 1000 according to embodiments of the present disclosure will be described below with reference to the accompanying drawings.

Figure 7:
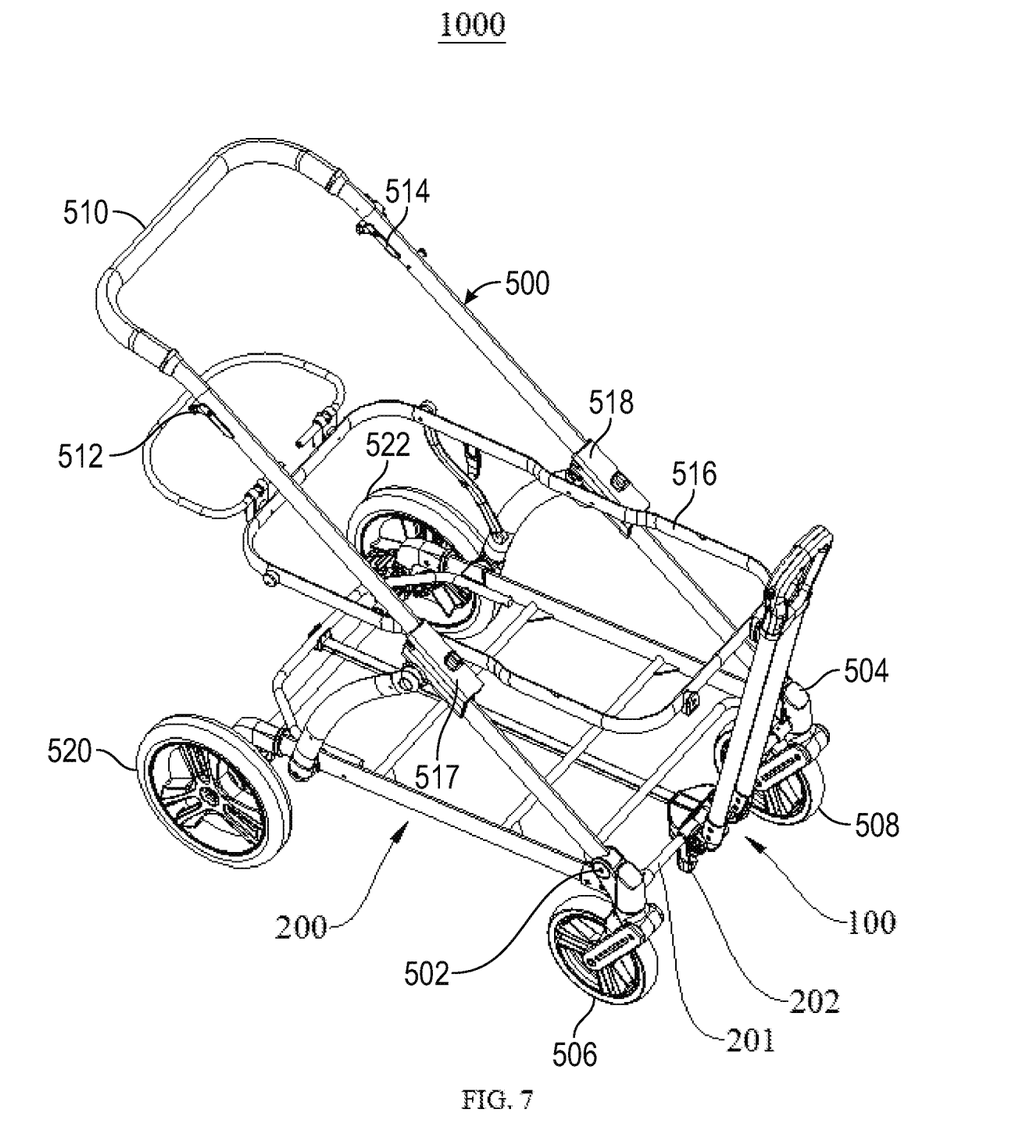
FIG. 7 is a schematic view of a structure of a cart according to an embodiment of the present disclosure.

As illustrated in FIG. 7, the cart 1000 according to embodiments of the present disclosure includes a pull handle assembly 100 for a cart according to above-described embodiments of the present disclosure.

In the cart 1000 according to embodiments of the present disclosure, by setting the pull handle 3 to be movable between the stored position where it is accommodated below the frame 200 and the extended position, when the pull handle 3 is in the stored position, the cart 1000 can become smaller, reduce the space occupied by the cart 1000, facilitate the user's operations, and reduce hindrance of the pull handle 3. For example, when the cart 1000 is adapted to carry an infant and the pull handle 3 is in the stored position, it is convenient for seating of the infant and interaction between the user and the infant. For another example, when the cart 1000 is used to carry cargo and the pull handle 3 is in the stored position, the space occupied by the cart 1000 is small to facilitate storage, and the pull handle 3 will not hinder the user's handling, to make handling of the cargo more convenient and faster. When the pull handle 3 is in the extended position, the pull handle 3 can be convenient for the user to pull the cart 1000, and facilitating controlling the direction of the cart 1000, to make traveling of the cart 1000 safer.

As shown in FIG. 7, in an embodiment the cart 1000 includes a collapsible push handle 500 that is attached to the frame 200 by pivot connections 502, 504 above rotatable front wheels 506, 508 that are pivotally connected to the frame. In an embodiment, the front wheels 506, 508 pivot about vertical axes when supporting the frame 200 on a horizontal surface. The vertical axes refer to the axes of the front wheels 506, 508, which are vertical. The push handle 500 includes a horizontal push bar segment 510 that projects rearwardly of the frame 200 and upper rail 516 above the rear wheels 520, 522. The push bar segment 510 is grasped by a user to push the cart 1000 in a forward direction (left to right in FIG. 7) while walking behind the frame 200. The push handle 500 includes release levers 512, 514 that are actuated to release slides 517, 518, which in turn are connected to and support upper rail 516, allow the push handle to pivot downward to lower the upper rail 516 toward the frame 200 and the push bar segment 510 toward the rear wheels 520, 522 to collapse the frame into a stored configuration.

In this embodiment, the cart 1000 provides dual means of locomotion. A user can use the push handle 500 to walk behind the frame 200 to push the cart 1000 forward while the pull handle assembly 100 is in the stored configuration in which the pull handle assembly is stored within, or in embodiments stored beneath, the frame 200. Alternatively, the user can pull the pull handle assembly 100 out from the forward end of the frame 200 to the extended configuration shown in FIGS. 1 and 7 and pull the cart 1000 while walking in front of the cart.

Other configurations (such as a travel unit, etc.) and operations of the cart 1000 according to embodiments of the present disclosure are well known by those skilled in the art, which will not be described in detail herein.

Reference throughout this specification to "an embodiment," "an example," means that a particular feature, structure, material, or characteristic described in connection with the embodiment or example is included in at least one embodiment or example of the present application. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and illustrated, it shall be understood by those skilled in the art that various changes, modifications, alternatives and variants without departing from the principle of the present disclosure are acceptable. The scope of the present disclosure is defined by the claims or the like.

What is claimed is:

1. A pull handle assembly for a cart having a frame, the pull handle assembly comprising:
   an elongated guide rail having a length extending in a traveling direction of the frame and provided below the frame;
   a slide block slidably provided on the elongated guide rail and configured to slide around the length of the elongated guide rail; and
   a pull handle movable between a stored position, where it is accommodated below at least a portion of the frame, and an extended position, wherein the pull handle comprises a rod part having a first end and a second end, and a grip part;
   wherein the grip part is disposed at the first end of the rod part and the second end of the rod part is pivotally connected to the slide block.

2. The pull handle assembly according to claim 1, further comprising a first pivot connection provided between the slide block and the second end of the rod part and configured to position the rod part relative to the slide block at a plurality of different pivot angles.

3. The pull handle assembly according to claim 2, wherein the first pivot connection comprises:
   a first pivot part provided on the slide block and internally defining a first pivot groove, a bottom wall of the first pivot groove being provided with first mating teeth;
   a second pivot part provided on the second end of the rod part and relatively rotatably connected to the first pivot part;
   a locking gear having an end provided with second mating teeth, the first mating teeth and the second mating teeth being engageable with each other; and
   a first elastic member configured to exert a force on the locking gear to urge the locking gear towards the first mating teeth.

4. The pull handle assembly according to claim 3, wherein the first mating teeth and the second mating teeth protrude towards each other, and the first mating teeth and the second mating teeth forming a ring gear structure.

5. The pull handle assembly according to claim 3, wherein the second pivot part fits over an outside of the first pivot part, the second pivot part internally defining a second pivot groove, and an end of the locking gear away from the second mating teeth is fixedly connected to the second pivot groove.

6. The pull handle assembly according to claim 5, wherein the second pivot groove is internally provided with:
   a center mounting column, the locking gear defining a fitting hole fitted over the center mounting column; and
   a plurality of positioning ribs radially arranged around a circumference of the center mounting column, the locking gear being provided with a plurality of positioning side plates extending towards the positioning ribs, two adjacent positioning side plates defining a positioning groove therebetween, the plurality of positioning ribs being fitted in the plurality of positioning grooves in one-to-one correspondence.

7. The pull handle assembly according to claim 6, wherein at least one positioning side plate defines a stepped groove, a circumferential wall of the second pivot groove is at least provided with one positioning block, and the stepped groove is fitted and positioned with the positioning block.

8. The pull handle assembly according to claim 3, wherein the second pivot part is mounted to the second end of the rod part through a sleeve, and the sleeve is integrally formed with the second pivot part.

9. The pull handle assembly according to claim 2, wherein the rod part comprises a first rod part and a second rod part each connected to the grip part and spaced apart from each other; and wherein the pull handle assembly further comprises a first pivot connection connecting the first rod part to the slide block and a second pivot connection that connects the second rod part to the slide block.

10. The pull handle assembly according to claim 1, further comprising a cross bar mounted on the frame perpendicular to the elongated guide rail and having a first pull handle retainer mounted on the cross bar, such that when the pull handle is in the stored position, the grip part is supported on the first pull handle retainer.

11. The pull handle assembly according to claim 10, further comprising a second pull handle retainer mounted on the cross bar spaced from the first pull handle retainer, the first and the second pull handle retainers each forming a hook structure.

12. The pull handle assembly according to claim 10, further comprising a locking structure provided in the grip part, such that when the pull handle is in the stored position, the locking structure engages the first pull handle retainer to limit freedom of movement of the pull handle.

13. The pull handle assembly according to claim 12, wherein the grip part defines an interior chamber, and the locking structure comprises:
 a body part provided in the interior chamber and movable in the interior chamber;
 a button part connected to the body part and protruding from the interior chamber;
 a hook part connected to the body part, the grip part defining a through hole, when the body part moves in the interior chamber, the hook part being able to extend out of or retract into the interior chamber via the through hole; and
 a second elastic member provided in the interior chamber and configured to exert a force on the body part to urge the hook part to extend out of the interior chamber.

14. The pull handle assembly according to claim 13, wherein the locking structure further comprises an abutting part connected to the body part, and two ends of the second elastic member abut against the abutting part and an inner wall of the interior chamber, respectively.

15. A pull handle assembly for a cart having a frame, the pull handle assembly comprising:
 a pull handle having a rod part and a grip part that is configured to be grasped by a user;
 a slide block configured to be mounted on the frame for sliding movement in a lengthwise direction of the frame and configured to slide around an elongated guide rail of the frame; and
 wherein the pull handle is pivotally attached to the slide block such that the pull handle pivots to a stored position in which the slide block and pull handle slide rearwardly relative to the frame so that the slide block and pull handle are under at least a portion of the frame and to an extended position in which the slide block is at a forward position relative to the frame and the pull handle pivots upward from the slide block to be grasped by the user.

16. The pull handle assembly of claim 15, wherein the rod part is attached to the slide block assembly by a detent connection that holds the pull handle at a selected upward pivot relative to the frame.

17. The pull handle assembly of claim 16, further comprising an elongated guide rail mounted on the frame, and wherein the slide block is slidably mounted on the elongated guide rail.

18. A cart, comprising:
 a frame having an elongated guide rail and front and rear wheels;
 a push handle pivotally connected to the frame and having a push bar segment above the rear wheels that is configured to be grasped by a user to push the cart in a forward direction;
 a pull handle assembly having a pull handle having a rod part and a grip part that is configured to be grasped by a user, a slide block mountable on the frame for sliding movement around the elongated guide rail in a lengthwise direction of the frame, and wherein the pull handle is pivotally attached to the slide block such that the pull handle pivots to a stored position in which the slide block and pull handle slide rearwardly relative to the frame so that the slide block and pull handle are stored under at least a portion of the frame, thereby facilitating a user pushing the cart forward with the push handle, and to an extended position in which the slide block is at a forward position relative to the frame and the pull handle pivots upward from the slide block to be grasped by the user, thereby facilitating the user pulling the cart forward with the pull handle assembly.

* * * * *